Oct. 12, 1937.　　　A. F. WILLAT　　　2,095,780

TRANSPORTATION METHOD AND APPARATUS

Filed April 23, 1934　　　7 Sheets-Sheet 1

INVENTOR.
ARNOLD F. WILLAT

BY

Robert N. Eckhoff
ATTORNEY.

Oct. 12, 1937.  A. F. WILLAT  2,095,780

TRANSPORTATION METHOD AND APPARATUS

Filed April 23, 1934   7 Sheets-Sheet 2

INVENTOR.
ARNOLD F. WILLAT
BY
*Robert N. Eckhoff*
ATTORNEY.

Oct. 12, 1937.    A. F. WILLAT    2,095,780
TRANSPORTATION METHOD AND APPARATUS
Filed April 23, 1934    7 Sheets-Sheet 4

FIG_11_

FIG_12_

FIG_23_

FIG_24_

INVENTOR.
Arnold F. Willat
BY Robert N. Eckhoff
ATTORNEY.

Oct. 12, 1937.     A. F. WILLAT     2,095,780
TRANSPORTATION METHOD AND APPARATUS
Filed April 23, 1934      7 Sheets-Sheet 7

INVENTOR.
ARNOLD F. WILLAT
BY
Robert N. Eckhoff
ATTORNEY.

Patented Oct. 12, 1937

2,095,780

UNITED STATES PATENT OFFICE 2,095,780

TRANSPORTATION METHODS AND APPARATUS

Arnold F. Willat, San Rafael, Calif., assignor to J. E. Shnell, San Francisco, Calif.

Application April 23, 1934, Serial No. 721,966

9 Claims. (Cl. 62—91.5)

This application is a continuation in part of my prior application Serial Number 622,295 filed July 13, 1932.

The invention is concerned with the utilization of solid $CO_2$ as a refrigerant. As is known, this material sublimes from a solid to a gas having a specific gravity of 1.53 times that of air.

The gas emanating from the solid $CO_2$ is, at the low temperature, very dry. In addition, it is an active drying agent, an accepted explanation being that the following reaction occurs:

$$CO_2 + H_2O \rightarrow H_2CO_3$$

Carbonic acid is only known as a water solution of $CO_2$. However, such a solution has a lower vapor tension than water and therefore evaporates more readily than water. When moisture is held in cell walls, as in a fibrous insulation, a water solution of $CO_2$ forms therein as a result of osmosis, the solution thereafter evaporating more readily than water alone. This drying effect of cold $CO_2$ gas is utilized in the present invention to preserve insulation for a cold chamber at a high degree of efficiency due to absence of water.

In connection with the use of cold, dry $CO_2$ gas as a dehydrator for the insulating material, this invention is concerned with a manner of discharge of gas into the insulation as well as the character of the gas discharged so that a very efficient insulation is secured by utilizing the gas to the utmost advantage. Hereinafter, therefore, certain details of construction and novel methods of construction will be disclosed since they lend themselves advantageously to the present invention. It is to be pointed out that in this invention the $CO_2$ gas is utilized to absorb heat from a space to be cooled in only thermal contact with the space so that the gas is dry when passed into the insulation and does not take up moisture from products in the space.

The invention also contemplates a controlled $CO_2$ gas content in the cold chamber to the end that decay of products in the chamber may be minimized. The $CO_2$ gas can be admitted into the chamber but this gas is preferably not utilized thereafter to dry the insulation since this might lead to a wetting of the insulation. An air conditioning system for the chamber is also included to attain the end that the $CO_2$ content of the atmosphere in which are stored the products may be regulated and varied. Thus, the $CO_2$ content may be kept at a high value during the journey to prevent certain decay and, at the end of the journey, reduced so that men can enter without masks.

The invention is also concerned with utilizing solid $CO_2$ as an effective refrigerating medium for commercial storage spaces particularly on trucks, cars and vessels. In this connection I wish to point out that while it has been proposed heretofore to utilize this material as a refrigerant, the control was such that efficient operation and uniform temperatures were not secured nor was the humidity of the cold chamber controlled. For example, Martin proposed, in his Patent 1,780,147, that the dry $CO_2$ be liberated directly into the cold chamber to contact the products therein. Under this condition, if the products were not sealed in containers, their moisture content would be reduced. With products such as eggs which are graded and sold on a weight basis, any reduction in weight represents a financial loss to the shipper. Consequently, a system as proposed by Martin can not be generally used. In accordance with this invention, the humidity conditions in the cold chamber are controlled and the water content thereof kept practically constant and at a value consistent with the product or products in the cold chamber, as is the carbon dioxide content.

Solid carbon dioxide available commercially varies widely in its purity; this is to be expected since it is secured from such varied sources as natural wells, fermentation processes, chemical manufacture and stack gases. In addition it often contains lubricating oil and moisture. In accordance with this invention, the products in the cold chamber are kept out of contact with the sublimated gas so that any odors therein are not taken up by the products. In shipping such odor sensitive substances as butter, milk and cheese, the cold gas is not allowed to come into contact with the products while its refrigerating and drying properties are utilized more or less fully.

In the commercial operation of a common refrigerator carrier, it is desirable that the products be precooled prior to shipment, since this reduces the load, due to respiration, on the refrigerator system of the vehicle or vessel. However, it frequently happens that the products are not precooled and must be placed immediately in the refrigerator on the vehicle or vessel. In the case of products which are not precooled or have not been cooled to an extent sufficient to take up sensible heat of the products and reduce exothermic reactions, as may occur during ripening or decay, to a low rate, the system, if it is to operate successfully, must be capable of taking up heat at a very high rate during the initial portion of the journey, while thereafter it is only called upon to take up that heat leaking into the cold chamber. This places upon the system widely varying load demands which the system must care for if it is to be successful. Obviously a system which can not take up the sensible heat, the reaction heat generated, and lower the temperature as well, can not be successful. The problem arises of adapting such a system quickly to a very much lower rate once the latent heat and the reaction heat have been cared for and the temperature of the cold chamber reduced to the operating temperature. That the change in operation must be made quickly to reduce the rate is a necessity, for otherwise the products may be frozen or at least subjected to an undesirably low temperature. A remote control is provided for securing this change.

The invention is also concerned with the control of humidity in the storage space. As has been pointed out, during the initial portion of the trip, cold is supplied at a high rate, particularly if the products have not been pre-cooled. During this period, the water content of the atmosphere is reduced by formation of ice on the cooling unit. If this is allowed to continue, the water content soon becomes too low and the atmosphere is so dry that dehydration occurs of products in the chamber. To avoid this, I propose to readjust the moisture content, removing excess moisture or supplying moisture if there is any deficiency so that the humidity is that best suited to the products. The removal of water from air is quite continuous because condensation goes on most of the time when wanted, while but a short time is required to remove condensed water or frost.

In cold weather, the temperature of the chamber, even when sublimation is at its lowest, might be too low for the product. In that case heat is turned on in the room. At the same time it might be advisable to dry the air still more and this may still be done by frosting the conduit and melting at intervals even when the heat is on. In other words, with this system it is possible to control automatically the moisture in the chambers and also the temperature within a large practical range.

The invention includes numerous other objects and features which will appear in the following detailed description of apparatuses and methods of my invention.

In the drawings:

Figures 11 and 12 are sections showing the construction of other units.

Figure 23 is a section in side elevation, and

Figure 24 a section in plan to illustrate gas circulation.

Figure 1:
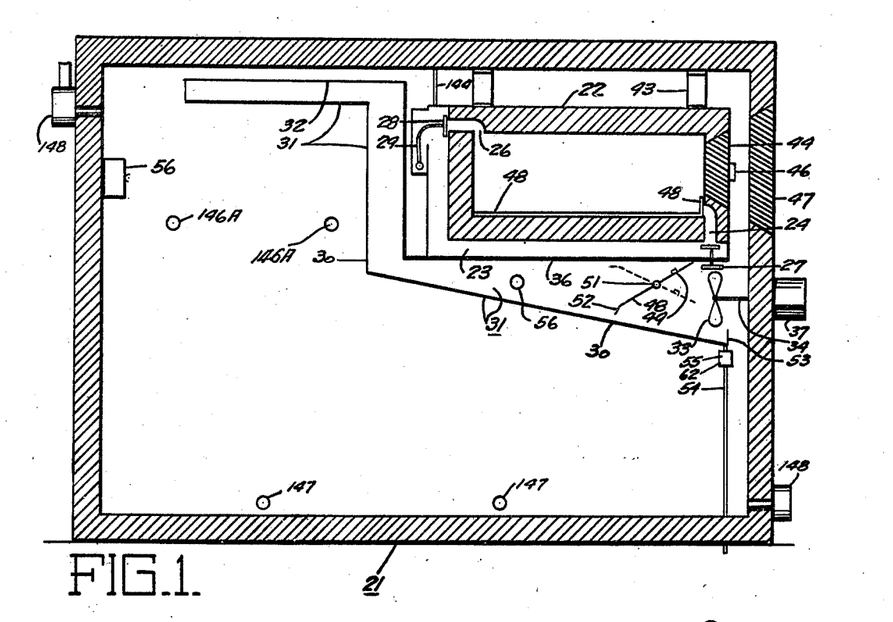
Figure 1 is a section through a refrigerated chamber including various features of my invention.
Figure 16:
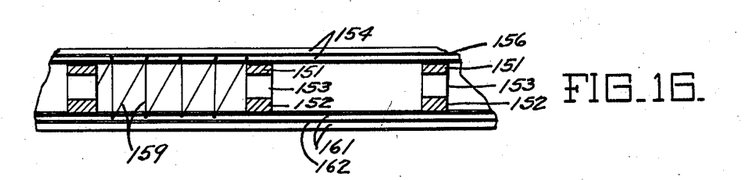
Figure 16 is a sectional view and Figure 17 an elevational showing of insulation construction.
Figure 17:
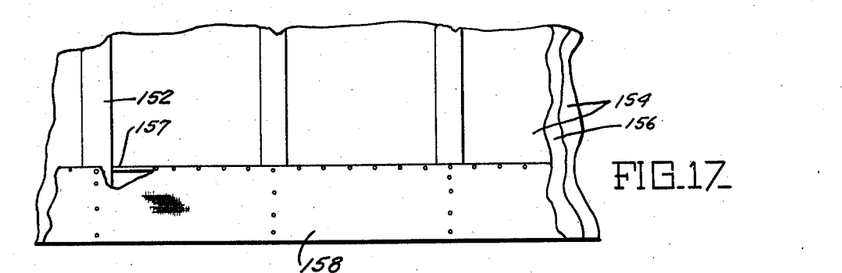

In Figure 1 I have shown a refrigerator embodying features of my invention. The chamber for the products to be maintained cold is indicated by 21. This chamber can be of any suitable construction but I prefer that presently described in detail in connection with Figures 16 and 17. The chamber can be mounted on a truck chassis, placed in a steamer hold, or it can be a refrigerator car, or whatever other character of cold chamber is desired.

To supply cold to the chamber, a container 22 is provided for the solid $CO_2$. This container is preferably heavily insulated so that substantially all heat carried into the solid $CO_2$ packed in the container is carried in by the sublimed $CO_2$ gas which passes through sheet metal conduit 23. The conduit 23 extends along the bottom of the container and up one side so that cold heavy gas can enter through port 24 and pass along the conduit in only thermal contact with the atmosphere of the chamber, rising as it takes up heat, to return through port 26 to contact with the solid $CO_2$ in the container. A hand valve 27 is provided to close off port 24 or to regulate the fall of gas therethrough as desired. A petcock (not shown) is also included in the conduit, the conduit sloping toward the petcock, so that any water and oil can be removed.

A valve member 28 is mounted adjacent port 26. This member is moved by means responsive to temperature so that the return of gas is controlled to the end that a desired temperature is maintained. The valve member 28 is carried by a member 29 which can be a strip of bimetal, as in Figure 11 of my prior application, or it can merely be a support, the position of which is determined by temperature responsive and regulatable means.

Since the invention is primarily concerned with large scale commercial refrigeration wherein the weight of products carried in chamber 21 is measured in tons, I provide means for circulating the atmosphere of the chamber so that a uniform temperature can be maintained even in remote portions of the chamber. Sheet metal member 31 is provided adjacent the conduit 23 and forms a trough about the conduit. This trough is continued to adjacent the top of the chamber by another sheet metal member 32. At the top of the chamber, the trough flares and is so arranged that the cold atmosphere is directed to all portions of the chamber. The product side of the drip pan and trough is covered with a layer 30 of heat insulating material so that moisture does not condense thereon and thereafter drip onto the products beneath.

Figure 3:
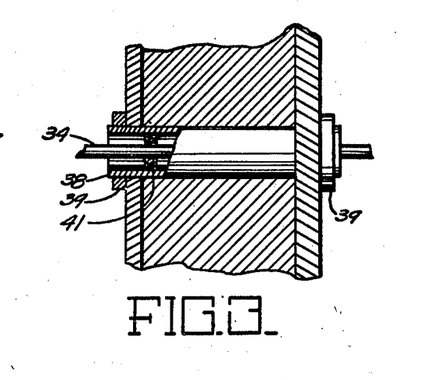
Figure 3 is a view, partly in section, of a fan shaft mounting in a refrigerator wall.

To assist in forcing the cold atmosphere about, I provide a fan 33 on a shaft 34 for forcing the atmosphere over bottom 36 of the conduit and through the trough. The shaft 34 is preferably extended through the wall of the chamber to a motor 37. As appears in Figure 3, a tube 38 of a poor heat conductor as bakelite is held by collars 39 against the walls, the shaft extending through the tube and being sealed by several felt washers 41. Several fans can be used if desired.

Figure 2:
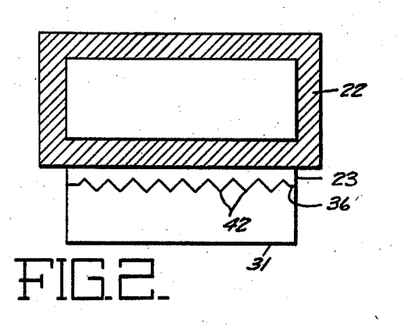
Figure 2 is a section through the $CO_2$ carrying chamber of Figure 1.

The bottom 36 of the conduit is preferably fluted or corrugated as appears at 42 in Figure 2. This increases the metal surface and permits of a high rate of heat extraction from the circulated atmosphere. If desired, the entire trough, including the side walls and bottom, can be so constructed, as I have indicated in Figure 7, or fins can be used. However, the fluted or corrugated construction is a simple one.

The container 22 is shown as suspended by brackets 43 from the ceiling of the chamber. It can also be supported from the side walls or from the floor, as in Figure 4. But no matter how it is supported, an air space is preferably left about the container so that any effect of the extremely cold $CO_2$ stored in the container is utilized to cool the chamber rather than to cool its walls directly.

The contents of the container 22 are replenished through door 44 which can be securely latched in place by latch 46 to keep container 22 gas tight. To reduce heat losses, a door 47 is provided in chamber 21 so that the container can be re-iced without entering the chamber through the main entrance way, door 47 being adjacent door 44.

To permit of container 22 being completely filled, ports 24 and 26 are formed respectively in a side wall and in the top so that the $CO_2$ ice can not clog them, spacing rails 48 being included in the container. By having the ports formed in this manner, a longer gas travel path is secured, and the flow of gas is directed onto the solid $CO_2$ in the container 22, while the rails prevent clogging the ports.

In operation, the speed of the motor is controlled to vary the rate of cooling of the chamber as well as to effect a control of the chamber humidity. When the motor runs slowly, the moisture in the room condenses and possibly freezes on bottom 36. This reduces the total water content of the chamber atmosphere. To assist in this, vane 48 is provided in the trough, the vane being offset but balanced by weight 49 about shaft 51. When the fan runs slowly, the vane is in the full line position in Figure 1. In this position, the atmosphere passes through the trough slowly and is cooled by contact with the conduit 23.

When the motor is run at a higher speed, the force of the fan discharge striking the turned end 52 of the vane moves the vane to the dotted line position in which the atmosphere is directed against the bottom of the conduit 23. This results in melting of the ice on the bottom of the conduit. The water thus formed drips down onto member 31 and collects in a sump formed by lip 53 on member 31. A pipe 54 and valve 55 serve to control the removal and disposal of water thus collected.

If the humidity of the room is too high, as shown by comparison of a dry and wet bulb thermometer, the collected water can be drained off. If, on the other hand, it is desired that a certain humidity be maintained in the chamber, a volume of water can be atomized in the chamber, the volume atomized depending on the control and degree of humidity desired. While a hand atomizer can be used, I have shown an automatic air operated device 56 in Figure 1 which will atomize water and discharge it at a known rate, at one or more points in the chamber, as desired.

Figures 5, 6, 7, 8:
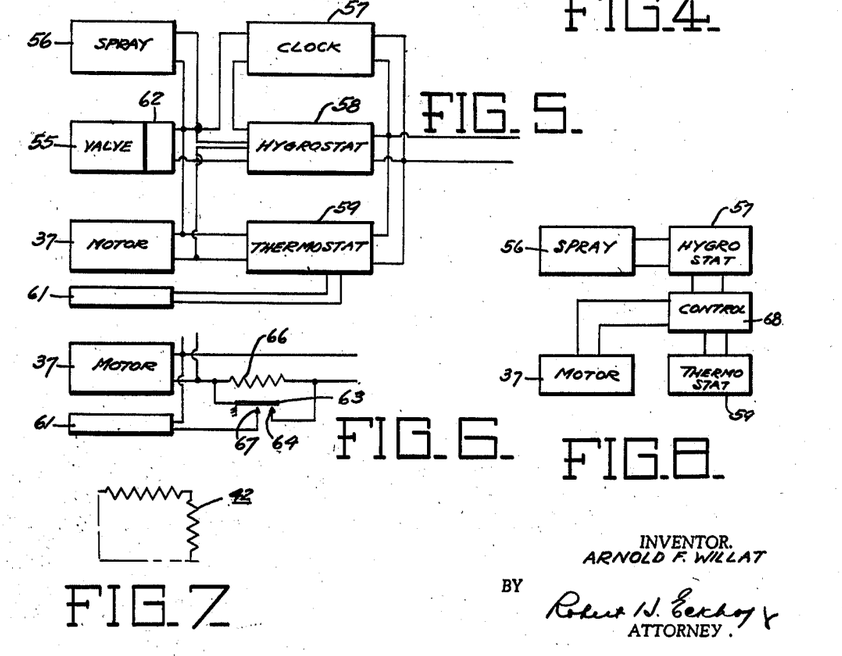
Figures 5, 6, and 8 are diagrams of control systems and arrangements.
Figure 7 is a section of a conduit.

While the foregoing operation can be obtained by a supervising operator, I prefer to have it automatic. In Figure 5 I have shown an automatic operating system which includes an operating device 61 for valve member 28, the spray devices 56, valve 55 and motor 37. These are under the control of a clock 57, a hygrostat 58 and a thermostat 59. Whenever the temperature rises above a predetermined value to which the thermostat is adjusted the operating device 61 for valve member 28 is actuated whereby the valve member is moved and the motor is operated at full speed. While full speed operation of the motor results in de-icing of the bottom of the conduit, valve 55 is opened and closed by a solenoid 62 controlled by clock 57 and hygrostat 58. These also control the atomizer or spray device 56. Now moisture is taken out of the atmosphere normally very slowly and only periodic operation of valve 55 and spray device 56 is desirable. The clock 57 (see Figures 13 and 14 also) therefore is superimposed on the hygrostat and, if the hygrostat determines that a given operation is necessary, the operation occurs only at the next critical time as determined by the clock, usually once each hour or every two hours. The clock can either permit operation for a predetermined time or else merely initiate a called for operation. The hygrostat can speed up the motor if necessary even if the atmosphere is cold enough since but a few minutes operation is necessary to de-ice or to condense moisture.

To prevent the thermostat from having to make and break a heavy current, bimetallic strip 63, or other thermal responsive unit is utilized to short circuit with contact 64, the resistance 66. The strip 63 also cooperates with contact 67 to control the solenoid operator 61 for valve 55.

A simpler form of apparatus includes spray device 56 arranged to spray into the fan discharge through the trough so that moisture is quickly carried to all parts of the chamber. In this case, valve 55 is omitted, pipe 54 draining any water collected. When the fan runs at high speed, its air stream defrosts the plate 36 and carries the water vapor thereafter discharged into it from device 56 to all parts of the chamber, device 56 being in the high speed fan circuit. It is only necessary in this form to have the fan controlled by a device 68 which can be operated thermostatically and the spray device controlled by the hygrostat which can also run the fan at high speed as in Figure 8.

The air fan alone can be used to control humidity and the vane need not be used. However, the vane enables a higher air circulation rate to be attained without defrosting.

Another system of operation is to let the fan run at such a speed at all times that moisture collects on bottom 36 and drips into the pan or trough 31. Valve 55 is then controlled by the hygrostat 58 so that as long as the atmosphere is dry, the water remains in the trough, but when the atmosphere is too wet, the valve opens and the water drains off. If the atmosphere gets too dry, the hygrostat not only keeps the valve closed but operates spray device 56 as well.

Figure 13:
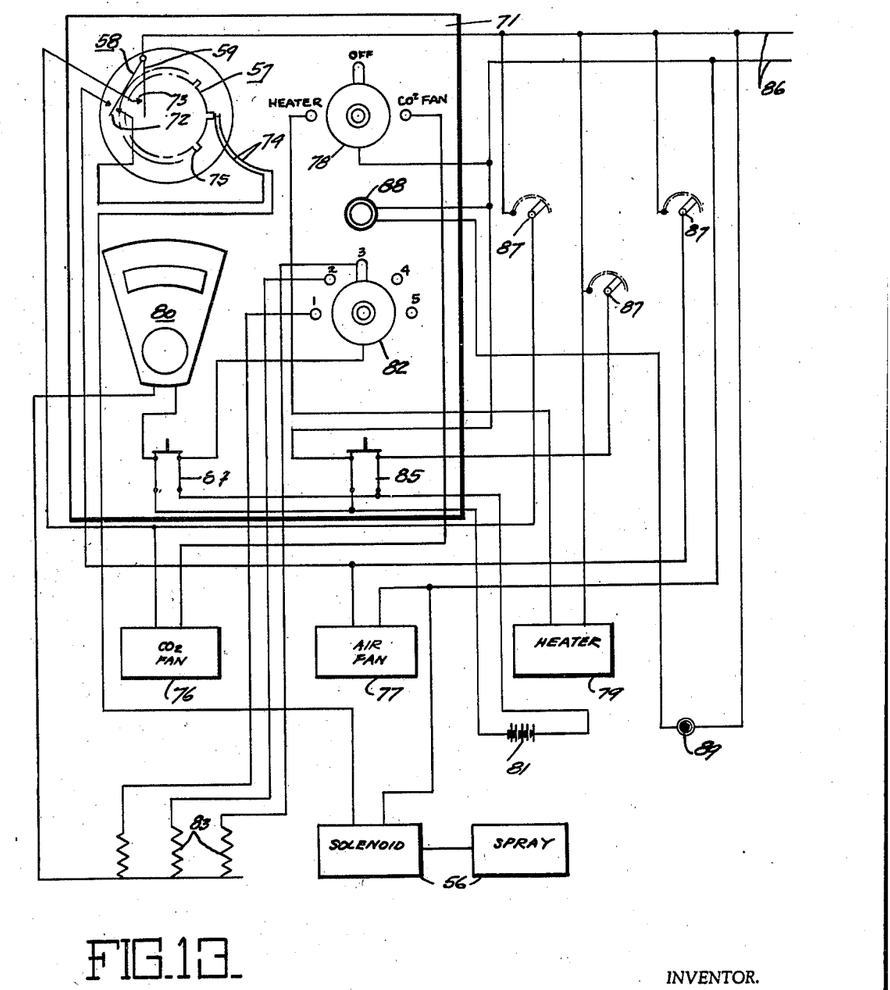
Figures 13, 14, and 15 are diagrammatic representations of control systems.

In Figure 13 I have shown one control system in some detail as applied to remote control on panel board 71. The operating elements 72 and 73 of the wet bulb 58 and the dry bulb 59, the active elements of which are in the chamber 21, are shown associated with contacts 74 and knobbed disc 75 of the clock device 57. These respectively control the $CO_2$ fan 76 and the spray device 56 and the air fan 77. The circuit to the $CO_2$ fan is controlled by knob switch 78 which also controls heater 79 in the chamber 21. With this arrangement the $CO_2$ fan and the heater cannot be operated at the same time although the air and heater can be. In shipping into cold climates it happens that the atmospheric temperature is lower than that of chamber 21 so that it is desirable to heat the chamber and protect the products therein against too much cold as well as too much heat.

A resistance type thermometer 80, operated by battery 81 and including knob switch 82 and resistances 83 disposed about the cold chamber is included. Switches 84 and 85 provide for control of the battery and its recharging from power lines 86.

Rheostats 87 are mounted on the back of the board. An alarm signal 88 is also included to be operated by push button 89 in the chamber if anyone should be locked therein by accident.

Figure 4:
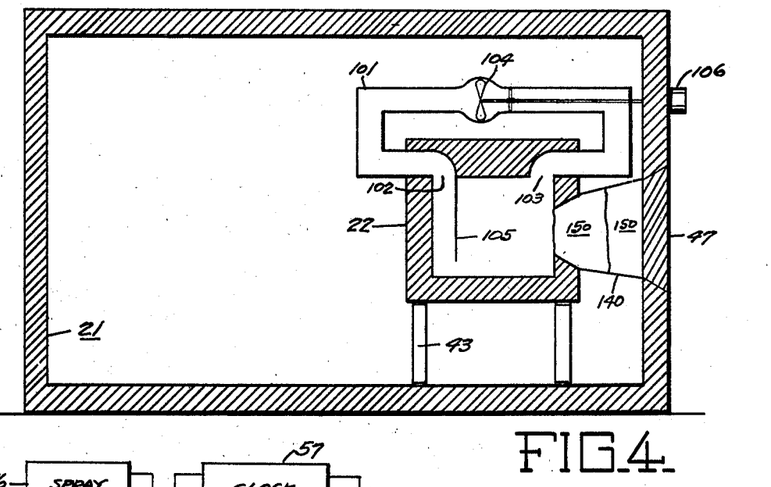
Figure 4 is a section through another refrigerated chamber, illustrating details of another cooling unit.
Figure 9:
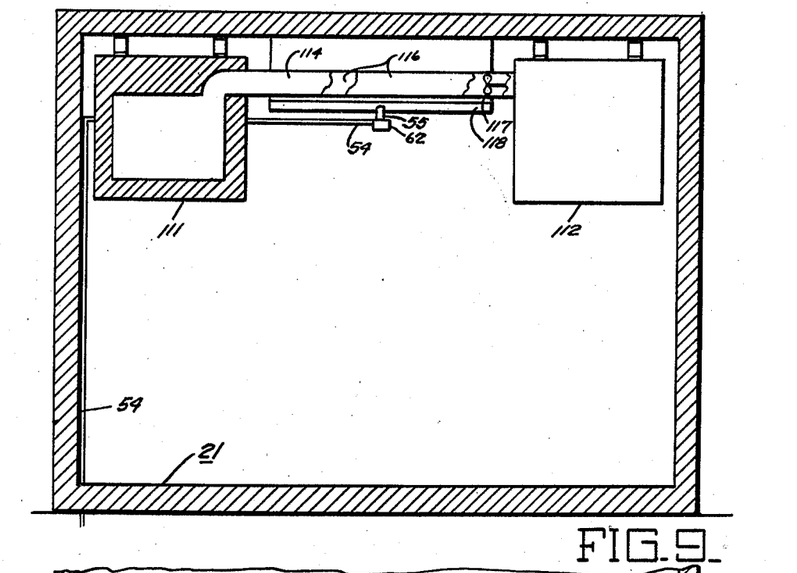
Figure 9 is a sectional side view, and Figure 10 a sectional plan view of another cooling unit and its arrangement.
Figure 10:
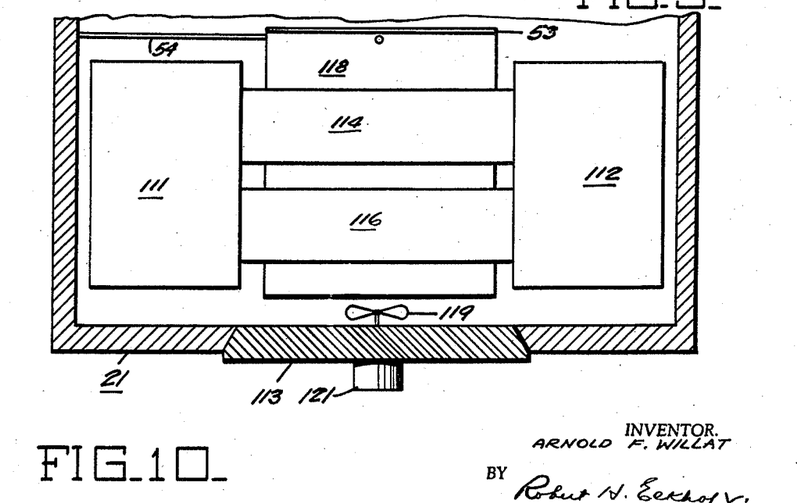
Figures 11, 12, 23, 24:
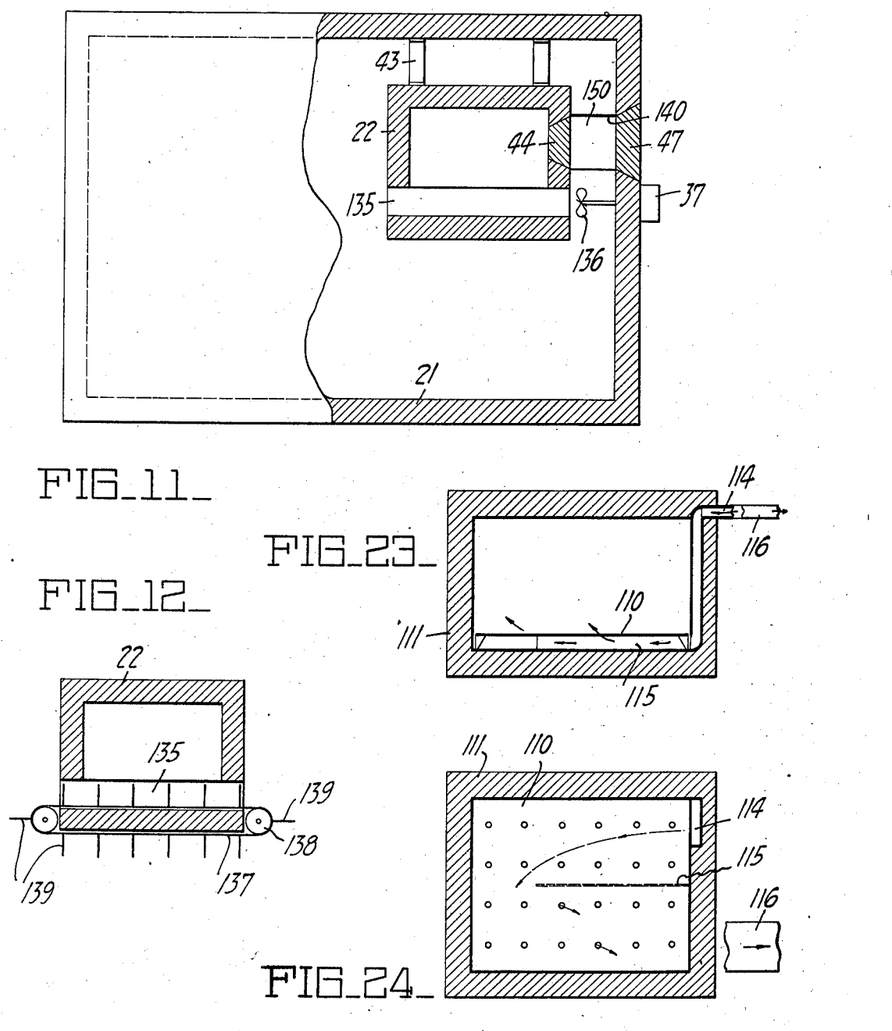

In handling loads which are not precooled and which have exothermic reactions going on, as ripening or decay reactions, it is desirable to be able to cool during the first portion of the journey very rapidly. Thus in a voyage from San Francisco to New York via the Panama Canal, cases of products as eggs and oranges were received at atmospheric temperature. During the first twenty-four hours, the load was cooled rapidly and thereafter at a very much lower rate. In fact, with the apparatus shown in Figures 4, 9, and 10, the low rate can be secured under some conditions to a satisfactory degree by the cold leakage through container 22. In Figure 4, chamber 21 includes container 22, supported therein, with a conduit 101 extending from one high level port 102 to another high level port 103. A fan 104 driven by a motor 106 is placed in the conduit and forces the $CO_2$ gas about the circuit which includes the conduit and the container 22 having solid $CO_2$ therein below ports 102 and 103. It is to be noted that the ports direct the gas down and about the refrigerant so that the gas is cooled upon contact with the $CO_2$. Usually bare solid $CO_2$ is used in precooling and ice wrapped in paper for ordinary refrigeration. Suitable vanes 105 can also be used to direct the circulated gas over the ice, or other circulation directing means. In Figures 23 and 24 return duct 114, later described in connection with Figures 9 and 10, is shown as including its outlet at the bottom of the chamber 111 which is much the same as chamber 22. Air and gas forced through duct 114 is released beneath apertured plate 110 spaced from the bottom of the chamber. This plate can be a sheet of metal suitably apertured or any other suitable support means as wooden slats. Irrespective of materials, however, the plate is usually provided with a vane 115 so that gas is forced along the bottom of the chamber, between the chamber and the plate 110 to prevent short circuiting to the end that gases entering outlet duct 116 are very cold because they have been forced under and in and about the solid $CO_2$.

When the sensible heat of the load has been taken up and the load cooled to between 32° and 40° F., the exothermic reactions proceed at a very low rate, practically zero. The fan 104 then need be rotated only when it is necessary to preserve the desired temperature, say 32° F. or some other definite temperature.

Since the inlet and outlet ports are at a high level and also at the same level, control is simplified. Cold is secured by forced circulation of the gas through the conduit and since this can be varied widely, the rate of cooling extends between wide limits. The essential to simplified control is the fact that the inlet and outlet ports are at the same level since this cuts off any thermal circulation by thermo-syphon effects. The inlet and outlet ports can be at the same level along the sides of the container 22 or at the bottom so long as they are at the same level.

Figure 20:
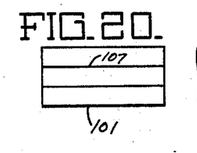
Figures 20, 21, and 22 are conduit constructions.
Figure 21:
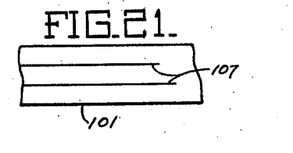
Figure 22:
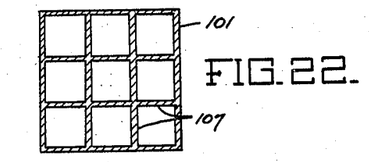

To cut down any localized circulation as a result of thermo-syphon effects, the conduit 101 can be sub-divided, as in Figures 20, 21, and 22 hereof, and as in Figures 13 and 14 of my copending application previously mentioned, into a plurality of small conduits by members 107. Such a system can be applied to gas circulation conduits with good results, enabling thermo-syphon gas circulation to be cut to a minimum. It is not necessary to extend the members throughout the lengths of the conduits (Figure 21) inasmuch as the thermo-syphon effects are local—very close to the inlet and outlet portions. Heat insulating collars adjacent to the refrigerating container where the conduits enter and leave are of material assistance.

In Figures 9 and 10, I have shown additionally two solid $CO_2$ containers 111 and 112 on each side of the chamber and adjacent loading door 113 for the chamber 21. These containers are connected by two parallel flues 114 and 116 through which gas is forced by fan 117 in flue 116. A trough 118 is extended about the conduits and a fan 119, driven by a motor 121 carried on the door, serves to circulate the atmosphere of the chamber about the flues or ducts. Since the gas ports are at the same high level and are above the solid $CO_2$, when the fan is not operating the gas does not flow even by natural circulation and the only cooling effect is that which leaks out of the insulated $CO_2$ container.

In the case of the apparatus in Figure 4 and Figures 9 and 10, the control can be after the manner in Figures 1, 5, and 6, and 13, except that the control for valve member 28 can be omitted as that element is not employed usually. In addition, the air and gas ducts, flues and troughs can be fluted, corrugated or finned after the manner of Figures 2, 7, 20, 21, and 22 and the trough 118 can include the vane 49.

Figure 19:
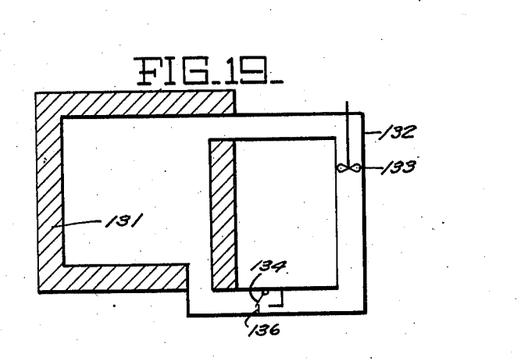
Figure 19 is a section of another unit.

While the structures shown in Figures 4, 9, and 10 permit of controlled circulation from zero to a very high rate, in some instances it is desirable to use another circulation system. In Figure 19 I have shown a structure wherein solid $CO_2$ container 131 includes a conduit 132 within which is a fan 133. This fan, when operating, forces gases down and into the solid $CO_2$, the opposite of the normal path, so that swing valve 134 is moved from off of seat 136. When the fan is not operating, the valve is seated and cold $CO_2$ gas can not circulate through the conduit since the valve prevents this. Conduit 132 can be made as in Figures 7, 20, 21, and 22, and valve 134 included therein.

In Figures 11 and 12 I have shown another satisfactory device in which container 22 is supported in chamber 21. This chamber includes a metal duct 135, one side of the duct forming the base on which rests the solid $CO_2$. In Figure 11, a fan 136 forces air through the duct to discharge cold air into the chamber while in Figure 12 a flexible belt 137 passes through the duct and over pulleys 138. The belt includes a plurality of slats 139 which, upon driving of the pulleys by a motor, are passed through the duct. The slats wipe the sides, top and bottom of the duct and keep it free of ice as well as circulating air through the duct so that the air is cooled by contact with the duct. If the air passed through the duct is cooled too much, a lower rate of air circulation can be used, as well as insulation placed between the solid $CO_2$ and the duct. As insulation a liquid, ice, and other poor conductors can be used as can fibre board and wood. To cut down heat losses as well as $CO_2$ escape into the chamber during icing, and while on a trip because the door might leak, I include a heat insulating collar 140, as shown in Figure 11, between the container 22 and chamber 21. When the chamber is not being iced, the collar is filled with a mass of insulating material in a pillow or pad 150 made to fit the collar and filled with insulation. In Figure 4, the door 44 has been omitted and several pads 150 employed instead.

The control of the described units can be in accordance with any of the several operation schemes disclosed and with combinations thereof.

Figure 14:
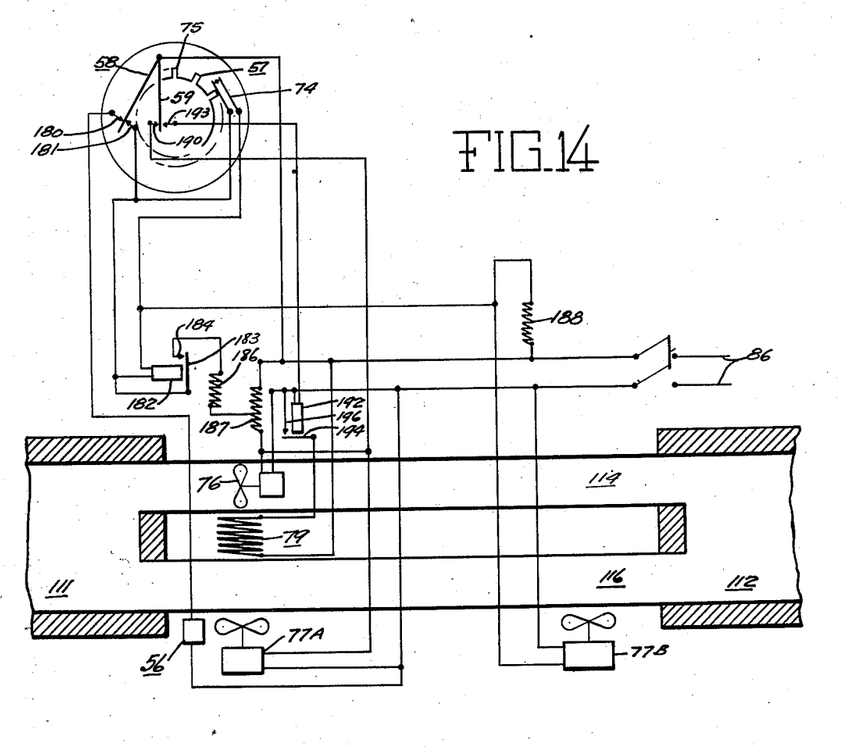
Figure 15:
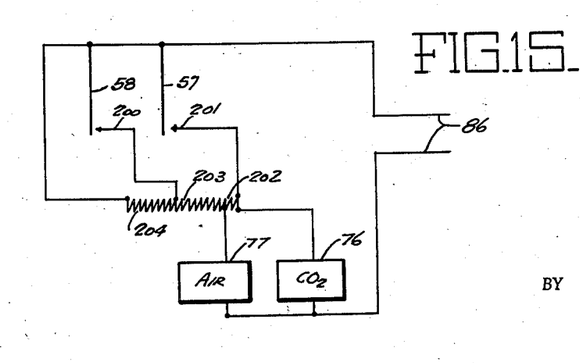

In Figures 14 and 15 I have shown other control systems, that of Figure 14 being particularly adapted to the structure of Figures 9 and 10. In this system, wet bulb 58 includes two contacts 180 and 181. When the atmosphere is too humid, contact 181 is engaged and with clock device 57 in such a position that contacts 74 are open, a circuit is completed to relay 182 so that arm 183 engages contact 184 to pass current through resistance 186 and through only a portion of resistance 187. This resistance is in series with the motor of $CO_2$ fan 76 which is connected across power line 86 so that the $CO_2$ fan always operates. The relation of resistance 186 and 187 to the motor is such that the motor runs at a higher speed when only resistance 187 is cut in. When resistance 186 cuts in on a portion of resistance 187 the motor operates at a lower speed. When resistance 186 is cut in, current also passes to the air drying fan 77B, the relay and the fan being in series at this time. This fan is also in series with a resistance 188 and line 86. The resistance 188 is such that when the circuit through contact 181 is open, the fan runs slowly, if at all, while it speeds up to some extent when the circuit through contact 181 is closed.

With the $CO_2$ fan running slowly, the gas circulates through the ducts 114 and 116 and moisture condenses thereon, thus lowering the water content as the moisture condenses and possibly freezes. When the clock closes contact 74, the relay 182 is shorted out whereby the fan 77B runs still faster to melt some of the frost. If the air is too dry, a circuit through contact 180 is immediately completed and spray device 56 operates. Depending upon the temperature, fan 77A may or may not be operating, this being controlled through dry bulb 59 and its contact 190. The spray device may discharge into the air stream from fan 77A as well as 77B.

The temperature in the chamber is controlled by the dry bulb 59 which, with contact 190, cuts fan 76 and fan 77A in at full speed if the temperature is too high, contact 190 shorting out resistance 187 on fan 76. When the temperature is too low—if it is necessary to protect the products against too low a temperature as when the temperature outside the chamber is very low—the dry bulb cuts in relay 192 with contact 193. Relay arm 194 engages contact 196 and cuts in heater 79. The humidity control is maintained at the same time so that the air does not become too wet or too dry.

It is possible to control humidity and cooling by controlling the rate of operation of the air fans 77A and 77B and the $CO_2$ fan 76. A hookup for this is shown in Figure 15. Wet bulb 58 includes a contact 200 and dry bulb 59 a contact 201. When the temperature is too high, the dry bulb engages contact 201 and runs the $CO_2$ fan and the air fan rapidly so that cooling occurs. When the contact 201 is not engaged, the series resistances 202, 203, and 204 prevent the $CO_2$ fan from operating unless the wet bulb engages its contact 200. In this case, resistance 204 is cut out and the air fan and $CO_2$ fan both operate, the $CO_2$ fan slowly and the air fan more rapidly, though not at full speed, so that moisture condenses on the cold pipes. This system can be used in conjunction with suitable portions of the other systems. Thus the heater 79 and the spray device 56 can be included.

Figure 18:
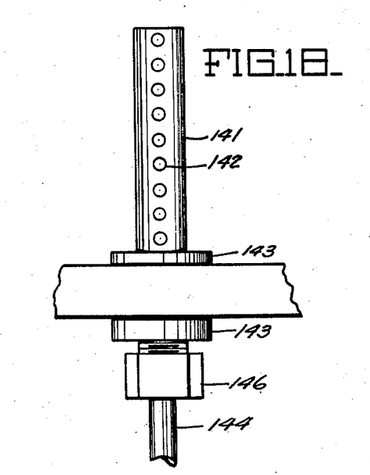
Figure 18 is a $CO_2$ gas appliance.

The excess gas present in the conduit system is dry and free from any of the atmosphere of the chamber cooled. This gas is used to advantage to insulate and keep dry the walls of the $CO_2$ container as well as the chamber 21. To permit gas to be discharged into a space or collected from a space for discharge into another space or the atmosphere outside the chamber 21, I provide the structure of Figure 18. A tube 141 is sealed at one end and includes numerous small apertures 142. Collars 143 screwed onto the tube hold it in position, gaskets being used if desired. The gas pipe 144 is connected to the tube by nut 146. This unit is attached to the chamber 21 at any convenient place usually in the ceiling as in Figure 1. A high level outlet is also usually employed from the insulation to ensure a low rate of $CO_2$ circulation and thorough permeation of the insulation. Relatively dead $CO_2$ gas is desired in the insulation rather than a fast moving stream.

If desired, $CO_2$ gas can be admitted into the chamber atmosphere though this is not usual. In fact the presence of $CO_2$ in the chamber due to respiration may be considerable and I therefore provided a fresh air inlet 146A and air outlet 147 controlled by suitable valves 148 operable from a remote point to admit new air, possibly conditioned, and exhaust the atmosphere in the chamber, a suitable ventilating system being thus provided. Since the $CO_2$ content on respiration has been found to be as high as 40%, attention is given to this factor.

The chamber 21 (Figures 16 and 17) is preferably formed by building a frame work of members 151 spaced from members 152 by spacers 153, the whole being suitably braced. An outer covering is fastened to members 151. This covering is preferably air tight, two, three ply composite boards 154 with a layer of air and moisture tight roofing paper 156 between and fastened to members 151, being satisfactory. The insulation is next placed. While this can be done in various ways, I prefer to deposit a fibrous insulation as cotton fibers or kapok with air since this gives a uniform and satisfactory wall. To do this, members 157 are secured between members 152 and a length of porous cloth 158 as burlap is nailed in place. The insulation is then fed into place in an air stream from a blower, the material being fed into a centrifugal blower or apparatus such as that shown in Patents 874,752, 1,550,037, and 1,789,096 being used. A top covering is placed temporarily and the insulation blown in, the burlap letting out the air. When the burlap bulges and seems uniform, the false cover is removed and a strong cord 159 is wound back and forth to form a cover for one layer and a support for the next. When the wall is complete, two layers of three ply board 161 with roofing paper 162 between, are nailed on over the burlap. The same procedure is followed for each wall, the top, bottom, and doors, except that string is not needed on floor and ceiling.

A satisfactory way to fasten the string is to run the string through an automatic hand stapling machine of a type commercially available, supplemental ring guides for the string being provided. The stapling device is known as a "Bostitch" stapler.

I claim:

1. A method of reducing the quantity of solid $CO_2$ required to refrigerate products that generate heat by ripening or decay reactions when stored in a refrigerating container, said method comprising circulating gaseous $CO_2$ in a closed circuit from a body of solid $CO_2$, circulating air in said container over a portion of said circuit at a rate sufficient to cool said products to a predetermined temperature and absorb heat generated by said products as well as freeze said products upon continuation of said circulation of air, and then circulating air at a rate insufficient to freeze said products but sufficient to maintain said products at said predetermined temperature.

2. A method of reducing the quantity of solid $CO_2$ required to refrigerate products that generate heat by ripening or decay reactions when stored in a refrigerating container, said method comprising circulating gaseous $CO_2$ in a closed circuit from a body of solid $CO_2$ and circulating air in said container over a portion of said circuit, said circulaton of gas and air being at a rate sufficient to cool said products to a predetermined temperature and absorb heat generated by said products as well as freeze said products upon continuation of said circulation, and then circulating gas and air at a rate insufficient to freeze said products but sufficient to maintain said products at said predetermined temperature.

3. A method of refrigerating products in a refrigerating container with a body of solid $CO_2$ comprising circulating $CO_2$ gas in a closed circuit from said body, circulating air in said container to abstract heat from said products and transmit said abstracted heat to said body of $CO_2$ through said circuit at a rate sufficient to freeze said products until a predetermined temperature is attained, and then circulating air in said container to abstract heat and transmit said abstracted heat to said body of $CO_2$ through said circuit at a rate only sufficient to maintain substantially said temperature.

4. In combination, a refrigerating chamber including therein a first chamber for solid $CO_2$, a second chamber for solid $CO_2$, a first and a second conduit extended between said chambers and joining said chambers to provide a circulatory system, and means for forcing air in said chamber over said conduits.

5. In combination, a refrigerating chamber including therein a first chamber for solid $CO_2$, a second chamber for solid $CO_2$, a first and a second conduit extended between said chambers and joining said chambers to provide a circulatory system, said conduits being connected to said chamber above the solid $CO_2$ level in said chambers, and means for forcing air in said chamber over said conduits.

6. In combination, a refrigerating chamber including therein a first chamber for solid $CO_2$, a second chamber for solid $CO_2$, a first and a second conduit extended between said chambers and joining said chambers to provide a circulatory system, means for forcing $CO_2$ through said system, and means for forcing air in said chamber over said conduits.

7. In combination, a refrigerating chamber including therein a first chamber for solid $CO_2$, a second chamber for solid $CO_2$, a first and a second conduit extended between said chambers and joining said chambers to provide a circulatory system, said conduits being connected to said chambers above the solid $CO_2$ level in said chambers, means for forcing $CO_2$ through said system, and means for forcing air in said chamber over said conduits.

8. In combination, a refrigerating chamber including therein a first chamber for solid $CO_2$, a second chamber for solid $CO_2$, a first and a second conduit extended between said chambers and joining said chambers to provide a circulatory system, means for forcing $CO_2$ through said system, means for forcing air in said chamber over said conduits, and means controlling operation of said forcing means for operating both said means when temperature in said chamber is above a predetermined temperature and for operating only a selected one of said forcing means when the temperature in said chamber is below said predetermined temperature.

9. In combination, a refrigerating chamber including therein a first chamber for solid $CO_2$, a second chamber for solid $CO_2$, a first and a second conduit extended between said chambers and joining said chambers to provide a circulatory system, said conduits being connected to said chambers above the solid $CO_2$ level in said chambers, means for forcing $CO_2$ through said system, means for forcing air in said chamber over said conduits, and means controlling operation of said forcing means for operating both said means when temperature in said chamber is above a predetermined temperature and for operating only a selected one of said forcing means when the temperature in said chamber is below said predetermined temperature.

ARNOLD F. WILLAT.